United States Patent [19]

Pav et al.

[11] Patent Number: 4,625,637
[45] Date of Patent: Dec. 2, 1986

[54] ROLL ASSEMBLY FOR USE IN CALENDERS AND THE LIKE

[75] Inventors: Josef Pav; Reinhard Wenzel; Rainer Schmidt, all of Krefeld; Peter Svenka, Grefrath; Richard Rauf, Krefeld, all of Fed. Rep. of Germany

[73] Assignee: Kleimwefers GmbH, Krefeld, Fed. Rep. of Germany

[21] Appl. No.: 726,067

[22] Filed: Apr. 23, 1985

[30] Foreign Application Priority Data

May 2, 1984 [DE] Fed. Rep. of Germany ....... 3416210

[51] Int. Cl.$^4$ .......................... B30B 15/26; B30B 3/04
[52] U.S. Cl. .................................... 100/47; 100/162 B; 100/170; 29/116 AD; 72/20; 72/243; 384/448
[58] Field of Search ........... 100/43, 47, 162 R, 162 B, 100/170; 29/113 AD, 116 AD; 72/19, 20, 241, 243, 245; 384/448, 1 A

[56] References Cited

U.S. PATENT DOCUMENTS 4,222,255  9/1980  Lehmann ............................. 72/243
4,299,162 11/1981  Hartmann et al. ..................... 100/43
4,520,723  6/1985  Pav et al. ......................... 29/116 AD X Primary Examiner—Peter Feldman
Attorney, Agent, or Firm—Peter K. Kontler

[57] ABSTRACT

The roll assembly of a calender has at least one roll with a deformable shell which surrounds a rigid carrier and whose end portions surround discrete antifriction bearings. The intermediate portion of the shell surrounds one or more rows of hydrostatic supporting elements which can be acted upon by adjustable fluid-operated motors to change the shape of the intermediate portion in a plane including the axes of the one roll and the neighboring roll as well as at right angles to such plane. Stresses which are applied to the bearings for the end portions of the shell are monitored by several sensors which transmit signals to a control system to regulate the deformation of the shell in such a way that the stresses upon the bearings are minimized or reduced to zero. This enables the intermediate portion of the shell to undergo deformation which is best suited for optimum treatment of the material passing through the nip of the one roll and the neighboring roll.

25 Claims, 8 Drawing Figures

ROLL ASSEMBLY FOR USE IN CALENDERS AND THE LIKE

BACKGROUND OF THE INVENTION

The present invention relates to roll assemblies which can be used in calenders and analogous machines to treat running tapes, strips or webs or discrete panels or sheets of flexible material, e.g., running paper webs or the like. More particularly, the invention relates to improvements in roll assemblies of the type wherein at least one roll of a pair of rolls which define between themselves a nip for the passage of a web or sheet of flexible material has a deformable shell and contains one or more rows of preferably hydrostatic supporting elements which are displaceable by discrete motors or groups of motors to change the shape of the adjacent portions of the shell.

Roll assemblies of the above outlined character are disclosed in numerous U.S. Letters Patents of the assignee as well as in British Pat. No. 10 58 934. The deformable shell of one of the rolls surrounds a rigid carrier whose end portions are fixedly mounted in the frame of the machine and which supports spaced-apart bearings for the end portions of the deformable shell. The intermediate portion of the shell surrounds a plurality of hydrostatic supporting elements which are displaceable by fluid operated motors, and such motors are adjustable by a control system which regulates the pressure in their cylinder chambers. The associated roll is mounted in bearings which are acted upon by variable forces to urge the associated roll toward the peripheral surface of the deformable shell. The forces acting upon the bearings for the associated roll determine the magnitude of stresses acting upon a web of flexible material in the nip between the two rolls. These forces are taken up by the bearings for the end portions of the deformable shell as well as by the hydrostatic supporting elements in the interior of the shell. It has been found that the patented roll assembly does not allow for a highly predictable (e.g., uniform) distribution of stresses in the longitudinal direction of the nip. This is due to the fact that the end portions of the shell are mounted on discrete bearings which, in turn, are mounted on the adjacent portions of the rigid and fixedly installed carrier for the shell. The bearings for the end portions of the shell prevent radial displacements of such end portions and they so prevent the intermediate portion of the shell from changing its shape in exact accordance with signals which are transmitted to the motors for the supporting elements in the interior of the shell.

German Auslegeschrift No. 10 26 609 discloses the possibility of mounting the bearings for the end portions of the deformable shell in such a way that the bearings are movable radially relative to the adjacent portions of the carrier. This solution is satisfactory as long as the bearings are actually free to move radially of the carrier. However, if the bearings happen to jam (e.g., if the radially extending guides for such bearings are out of commission), it is necessary to exert rather pronounced forces in order to shift the bearings radially of the carrier with the result that the purose of radial movability of the bearings is defeated and the deformable shell cannot assume an optimum shape for the treatment of webs or sheets of paper or the like.

German Offenlegungsschrift No. 28 18 011 discloses a roll assembly wherein two neighboring rolls are supposed to automatically define between themselves a clearance or gap of constant width. Each of these rolls is acted upon by a roll having a deformable shell through the medium of an intermediate roll. The bearings for the end portions of the deformable shells are adjustable in the radial direction of the respective carriers, and the hydrostatic supporting elements in the deformable shells are assembled into two groups. The supporting elements of each group can be shifted by adjustable fluid-operated motors and the bearings for the end portions of the shells carry pairs of sensors which are disposed diametrically opposite each other. The pressure of fluid which is admitted to the adjustable motors for the supporting elements is regulated in such a way that the end portions of the intermediate rolls are not stressed. This enables the two neighboring rolls of the roll assembly to establish and maintain between themselves a gap of preselected constant width. It has been found that the just discussed proposal is not entirely satisfactory because the forces acting upon the material to be treated cannot be regulated with a requisite degree of accuracy.

OBJECTS AND SUMMARY OF THE INVENTION

An object of the invention is to provide a roll assembly which can be used in calenders or like machines and wherein the stresses upon longitudinally extending portions of a web or sheet of material in the nip of two neighboring rolls can be regulated with a higher degree of accuracy than in heretofore known roll assemblies.

Another object of the invention is to provide novel and improved roll for use in calenders or like machines.

A further object of the invention is to provide novel and improved means for preventing undesirable stressing of the end portions of a deformable shell in a roll for use in a calender or the like.

An additional object of the invention is to provide a roll which can be used as a superior substitute for conventional rolls in existing calenders and like machines.

A further object of the invention is to provide a novel and improved method of regulating the distribution of stresses in the nip between the rolls of a roll assembly in a calender or a like machine.

Still another object of the invention is to provide a roll assembly wherein the rolls are movable relative to one another in a novel and improved way.

An additional object of the invention is to provide a novel and improved system of sensors for monitoring the stresses acting upon the bearings for the end portions of a deformable shell in a roll which is used in a calender.

The invention is embodied in a roll assembly, particularly in a roll assembly which can be utilized in a calender, which comprises a first roll rotatable about a first axis and a second roll which is rotatable about a second axis parallel to the first axis. The second roll comprises a flexible elongated cylindrical shell which defines with the first roll an elongated nip and has an internal surface, first and second end portions and an elongated intermediate portion. The second roll further comprises a rigid carrier which is surrounded by the shell, first and second bearings which are respectively interposed between the carrier and the first and second end portions of the shell, and signal generating first and second sensor means for monitoring the stresses which are applied to the first and second bearings in a plane including the axes of the two rolls and intersecting the nip, particularly when a web of material which is being treated by the roll assembly passes through the nip. The roll assembly further comprises means for counteracting the aforementioned stresses, including at least one row of preferably hydrostatic supporting elements which are installed in the shell between the first and second end portions and are surrounded by the corresponding parts of the intermediate portion of the shell, at least one adjustable motor installed in the shell between each supporting element and the carrier and serving to urge the respective supporting element toward the internal surface of the shell to thereby select the force with which the corresponding part of the intermediate portion of the shell is urged toward the first roll, and control means which is responsive to the signals from the sensor means and is operative to adjust the motors so as to minimize or eliminate the stresses to which the bearings are subjected by the respective end portions of the shell. The bearings can constitute or include antifriction ball or roller bearings.

The roll assembly can include means for transmitting to the control means additional signals (e.g., one or more reference signals) for adjustment of the motors as a function of at least one variable parameter such as the thickness of the running web, the temperature of the web, the temperature at the exterior of the first roll and/or others.

The sensor means can comprise two discrete sensors for each of the bearings and such discrete sensors are preferably disposed in the aforementioned plane and diametrically opposite each other with reference to the axis of the second roll. Each bearing can include an inner race which surrounds the carrier and the sensor means can be installed between the carrier and the respective inner races. For example, at least one of the sensor means for each bearing can be recessed into the carrier or the peripheral surface of the carrier can be provided with flats for the sensor means. The second roll can further comprise two sleeves each of which is interposed between one of the bearings and the carrier, and the sensor means can be recessed into the internal surfaces of the sleeves or into the external surface of the carrier within the confines of the respective sleeves.

The sensor means can constitute force, pressure, displacement and/or distance transducers. Each of the bearings can comprise two portions one of which surrounds the other with a small play so as to avoid jamming and thus reduce the likelihood of generation of inaccurate signals by the sensor means.

The counteracting means can comprise additional supporting elements which are angularly offset with reference to the supporting elements of the aforementioned row and which can form at least one additional row, and additional adjustable motors for the additional supporting elements. The second roll then preferably further comprises additional first and second sensor means which are disposed in the regions of the respective bearings and serve to generate signals denoting additional stresses acting upon the respective bearings substantially or exactly at right angles to the aforementioned plane. The control means is then operative to adjust at least the additional supporting elements in response to signals from the additional sensor means so as to minimize or eliminate the additional stresses.

At least one of the rolls can be provided with an elastomeric (visoelastic) outer layer which contacts the external surface of the other roll in the absence of any material in the nip between the rolls, and the roll assembly then preferably further comprises signal generating means for monitoring the temperature of the elastomeric outer layer at a plurality of locations which are spaced apart from one another, as considered in the longitudinal direction of the nip and the intermediate portion of the flexible shell. The control means is then designed to adjust the motors in the shell in dependency on the characteristics of the temperature-denoting signals at the respective locations.

The first roller can be disposed at a level above the second roller, and the roll assembly then comprises or can comprise a third roller which is at least substantially identical with the second roller and means for biasing the third roller downwardly toward the first roller. At least one additional roller can be interposed between the first and second and/or second and third rollers.

The roll assembly can comprise means for moving the carrier nearer to or further away from the axis of the first roll. For example, the axis of the first roll can be a fixed axis and the means for moving the carrier can comprise a pair of levers which are pivotable about fixed axes and support the carrier adjacent to the respective end portions of the shell, and fluid-operated motor means for pivoting the levers. The motor means can be used to bias the shell (e.g., an elastomeric outer layer of the shell) against the first roll or against a web of material in the nip between the rolls. The axes of the first and second rolls are or can be disposed at different levels.

The novel features which are considered as characteristic of the invention are set forth in particular in the appended claims. The improved roll assembly itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
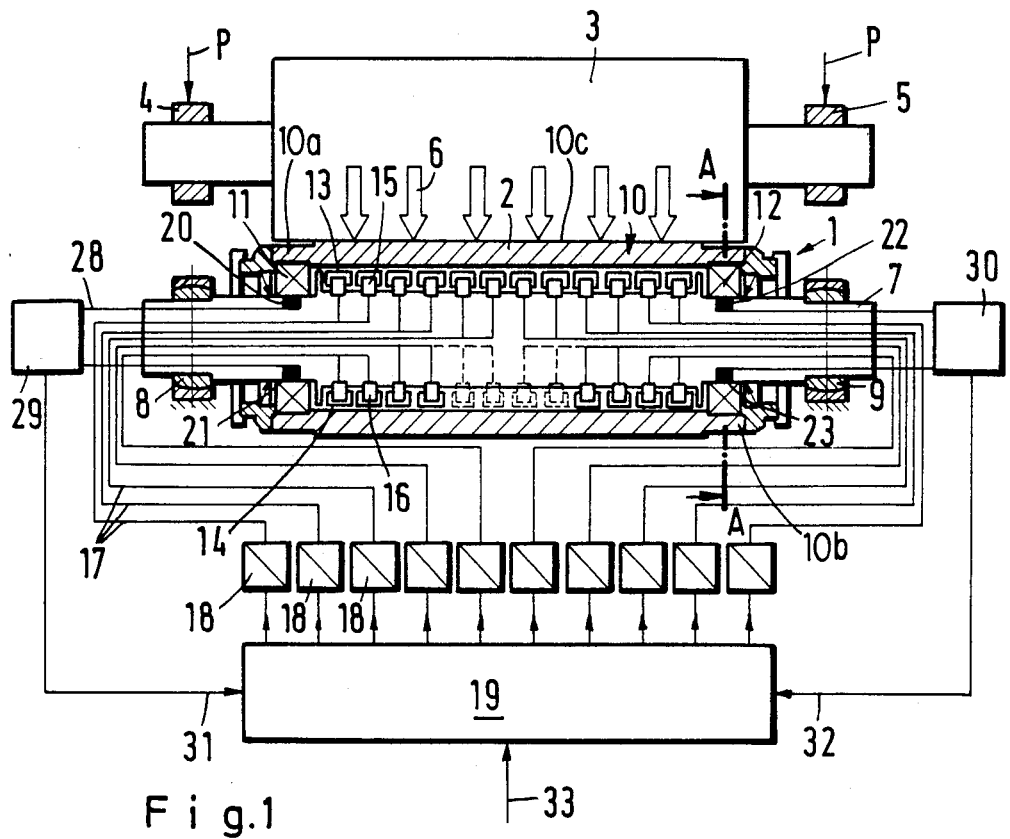
FIG. 1 is an elevational view of the first roll and an axial sectional view of the second roll of a roll assembly which embodies one form of the invention.
Figure 2:
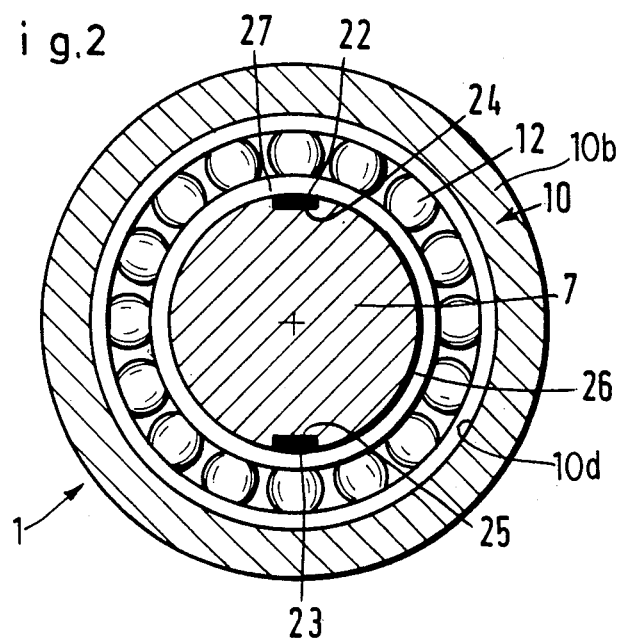
FIG. 2 is an enlarged transverse vertical sectional view of the second roll as seen in the direction of arrows from the line A—A of FIG. 1.

Referring first to FIGS. 1 and 2, there is shown a roll assembly which can be used in a calender for webs or sheets of paper or the like and comprises a first roll 3 rotatable in bearings 4, 5 about a first horizontal axis, and a second roll 1 which is disposed at a level below the roll 3 and is rotatable about a fixed second horizontal axis which is parallel to the axis of the roll 3. The peripheral surfaces of the rolls 1 and 3 define an elongated nip 2 for the passage and treatment of successive increments of a moving web or sheet; such web or sheet advances at a right angle or at an oblique angle to the plane of FIG. 1, i.e., at least substanially tangentially of the peripheral surface of the roll 1 shown in FIG. 2. The bearings 4, 5 are acted upon by forces P so that the peripheral surface of the roll 3 bears against the peripheral surface of the roll 1 or against a web or sheet of material in the nip 2 to subject the deformable (flexible) elongated cylindrical shell 10 of the roll 1 to stresses which are denoted by the arrows 6.

The roll 1 further comprises a rigid carrier 7 whose end portions are non-rotatably mounted in stationary spherical bearings 8 and 9 which, in turn, are mounted in the frame of the machine embodying the improved roll assembly. Spaced-apart portions of the carrier 7 support bearings 11 and 12 for the respective end portions 10a and 10b of the shell 10, and the diameters of the end portions of the shell 10 are reduced (see FIG. 1) so as to ensure that the peripheral surface of the roll 3 or a web or sheet of material in the nip 2 bears only against the elongated intermediate portion 10c of the shell 10 when the roll assembly is in actual use. Each of the illustrated bearings 11 and 12 is an antifriction ball or roller bearing with a stationary inner race 27 surrounding the respective portion of the carrier 7, an outer race surrounded by and rotating with the respective end portion 10a or 10b of the shell 10, and at least one annulus of rolling elements between the two races.

The roll 1 further comprises a first row of hydrostatic supporting elements 13 which are disposed at a level above the carrier 7 and each of which is or can be urged upwardly toward the adjacent portion of the cylindrical internal surface 10d of the shell 10 by at least one adjustable fluid-operated motor 15, and a second row of hydrostatic supporting elements 14 which are disposed at a level below the carrier 7 and each of which is or can be urged downwardly toward the adjacent portion of the internal surface 10d by at least one adjustable fluid-operated motor 16. The supporting elements 13, 14 and the motors 15, 16 constitute a means for counteracting the stresses which are denoted by the arrows 6 and for ensuring that the bearings 11 and 12 are not subjected to any or are subjected only to negligible radial stresses when the roll assembly is in actual use. The cylinder chambers of the motors 15, 16 can receive a pressurized gaseous or liquid medium (e.g., oil) by way of conduits 17 which communicate with channels or bores in the fixed carrier 7 and receive pressurized fluid from one or more suitable sources by way of electrohydraulic or electropneumatic transducers 18 which are opened or closed in response to appropriate signals from the corresponding outputs of a control unit 19. The transducers 18 may be of the type known as D 648 manufactured and sold by the firm Moog GmbH, Böbliongen, German Federal Republic. The pressure in each of the adjustable motors 15, 16 can be varied individually, or the pressure in groups of two or more motors 15 and/or 16 can be varied jointly, depending on the design of the roll assembly and the desired extent of individual regulation of forces acting upon relatively small sections of the intermediate portion 10c of the flexible shell 10.

The stresses upon the bearing 11 are monitored by two sensors 20, 21, and the stresses upon the bearing 12 are monitored by two additional sensors 22, 23. The sensors 20-23 are preferably disposed in a plane which includes the axes of the rolls 1, 3 and intersects the nip 2; the sensors 20, 21 are disposed diametrically opposite each other with reference to the axis of the roll 1; and the sensors 22, 23 are also disposed diametrically opposite each other (see FIG. 2) with reference to the axis of the roll 1. In the embodiment of FIGS. 1 and 2, the sensors 20-23 are installed in recesses which are provided therefor in the peripheral or outer surface 26 of the adjacent portion of the carrier 7 (see FIG. 2 which shows the recesses 24, 25 for the respective sensors 22, 23 in the region of the bearing 12). The sensors 20, 21 and 22, 23 are surrounded by the inner races 27 of the respective bearings 11 and 12. Each of the sensors 20-23 can constitute a force, pressure, displacement or distance transducer of any known design. For example, the sensors 20-23 may be of the type known as 53 manufactured and distributed by the firm Sensotec, German Federal Republic. The control unit 19 may be of the type known as LSI 11/23 manufactured and sold by Digital Equipment. It is immaterial whether the sensors 20-23 operate optically, mechanically, electrically, magnetically and/or otherwise; all that counts is to ensure that they can furnish reliable signals denoting the magnitude of stresses prevailing between the carrier 7 and the adjacent portions of the respective inner races 27. The outputs of the sensors 20, 21 and 22, 23 are respectively connected with the corresponding inputs of two transducers 29, 30 whose outputs, in turn, are connected to the corresponding inputs of the control unit 19 by conductor means 31 and 32. The transducers 29, 30 may be of the type known as GTY manufactured and sold by Brown-Bovery Corporation. These transducers transmit signals which are indicative of the differences between the intensities and/or other characteristics of signals furnished by the respective sensors 20, 21 and 22, 23, and such signals are evaluated by the control unit 19 which then transmits appropriate signals to selected transducers 18 in order to shift selected supporting elements 13, 14 toward or away from the axis of the roll 1 and to thus counteract and/or uniformize the stresses 6 so as to prevent stressing of the bearings 11 and 12. Signals which the transducers 29, 30 receive from the corresponding sensors 20, 21 and 22, 23 via conductors 28 can denote the direction and/or magnitude of forces acting between the carrier 7 and the respective inner races 27. The transducers 29 and 30 can transmit positive or negative signals which enable the control unit 19 to adequately regulate the admission or evacuation of pressurized fluid into and from the cylinders of selected adjustable motors 15, 16.

The arrow 33 denotes in FIG. 1 one of several additional inputs which serve to transmit to the control unit 19 additional signals, such as reference signals which are supplied by adjustable potentiometers (not shown) and denote the desired magnitude of stresses 6, the maximum permissible stressing of the bearings 11, 12, the maximum permissible temperature of the shell 10, the maximum permissible temperature of the peripheral surface of the roll 3, the magnitude of the forces P and/or other parameters.

The control unit 19 regulates the transducers 18 for the purpose of preventing undue stressing of the bearings 11 and 12. The inner race 27 of each of the bearings 11, 12 surrounds the respective portion of the external surface 26 of the carrier 7 with a certain small play so as to avoid any prestressing of the bearings 11 such as could adversely influence the regulating action of the control unit 19. In other words, the bearings 11 and 12 do not transmit any stresses or forces to the respective end portions 10a and 10b of the shell 10. This allows for deformation of the intermediate portion 10c of the shell 10 under the action of selected supporting elements 13, 14 and their motors 15, 16 as well as under the action of the associated roll 3. This, in turn, ensures that the roll assembly of FIGS. 1 and 2 can effect uniform distribution of stresses 6 along the full length of the nip 2 between the intermediate portion 10c of the shell 10 and the peripheral surface of the roll 3 such as is best suited for uniform treatment of the full width of a sheet or web of flexible material passing through the nip 2. The play between the bearings 11, 12 and the respective portions of the carrier 7 can match or need not appreciably exceed that which is customary in a sliding seat.

In accordance with one presently preferred embodiment of the invention, the sensors 20 to 23 can constitute or include wire strain gauges. Electric sensors can be used with equal or similar advantage. Alternatively, if the sensors are distance or displacement transducers, they can operate optically or electromagnetically and can constitute proximity detectors.

The improved roll assembly exhibits the advantage that it allows for any desired distribution of stresses, as considered in the longitudinal direction of the nip 2. Thus, the control unit 19 can be programmed to uniformize the stresses in each and every part of the intermediate portion of the shell 10. This is attributable to the provision of sensors 20-21 and 22-23 which enable the control unit 19 to eliminate or at least minimize the stresses acting upon the bearings 11 and 12 in the plane including the axes of the rolls 1 and 3. Thus, the shell 10 can receive only those stresses which are transmitted thereto by the supporting elements 13, 14 and/or by the roll 3 and/or by the web of material running through the nip 2 when the roll assembly is in use in a calender or an analogous machine. Since the control unit 19 can regulate the stresses which are applied by the supporting elements 13 and/or 14, each and every longitudinally extending portion of a web in the nip 2 can be acted upon with an accurately determined force. The end portions 10a and 10b of the shell 10 actually float on the respective bearings 11, 12 and/or the bearings float on the respective portions of the carrier 7 to thus invariably ensure that the bearings 11 and 12 cannot adversely influence the stresses in the nip 2. The forces P and the weight of the roll 3 are taken up exclusively by the supporting elements in the interior of the shell 10. The improved roll assembly can eliminate the highly undesirable W- and M-profiles of the shell 10. All that the control unit 19 has to do is ensure that the distribution of pressures in the motors 15 and/or 16 longitudinally of the intermediate portion 10c of the shell 10 corresponds to the desired deformation of the intermediate portion and that, at the same time, the sum of all forces which are generated by the supporting elements 13 and/or 14 matches the sum of oppositely directed forces which are transmitted by the roll 3.

The feature that the sensors are mounted on or in the carrier 7 (instead of rotating with the shell 10) is desirable and advantageous because this simplifies the establishment of connections (conductors 28) between the sensors and the respective transducers 29, 30.

Figure 3:
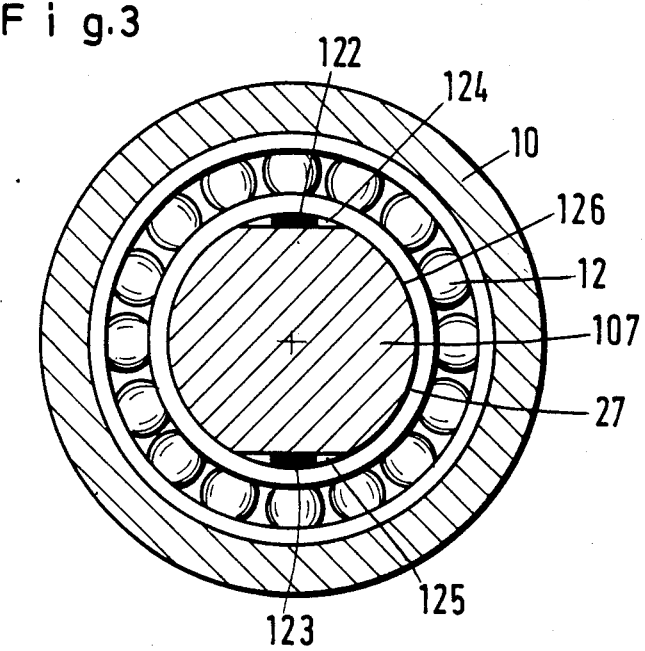
FIG. 3 is a similar transverse vertical sectional view of a modified second roll.

FIG. 3 shows a portion of a modified roll which can be used in lieu of the roll 1 and whose carrier 107 for the shell 10 has a peripheral or outer surface 126 provided with pairs of flats 124, 125 in the regions of the respective antifriction bearings. FIG. 3 merely shows the flats for the sensors 122, 123 which monitor the stresses between the inner race 27 of the bearing 12 and the adjacent portions of the carrier 107. If the bearing 12 is subjected to undue stresses, its inner race 27 undergoes deformation which induces the sensors 122, 123 to transmit signals of corresponding intensity and/or other characteristics to the transducer 30 (not shown in FIG. 3) for transmission of modified signals to the corresponding input of the control unit. Some deformation of the inner races 27 is acceptable because it is short-lasting, i.e., the control unit ensures that the deformation (or undue deformation) of the inner races 27 is terminated with a minimum of delay as soon as the sensors 122, 123 and/or the sensors for the other antifriction bearing transmit signals which indicate that an adjustment of certain motors 15 and/or 16 is necessary.

Mounting of the sensors (such as the sensors 122, 123 of FIG. 3) adjacent to flats (124, 125) which are provided at the periphery of the carrier is often desirable and advantageous because this allows for more pronounced deformation of the parts (such as the inner races 27) which are outwardly adjacent to the sensors. This, in turn, enables the sensors to more accurately ascertain the stresses acting upon the respective bearings.

Figure 4:
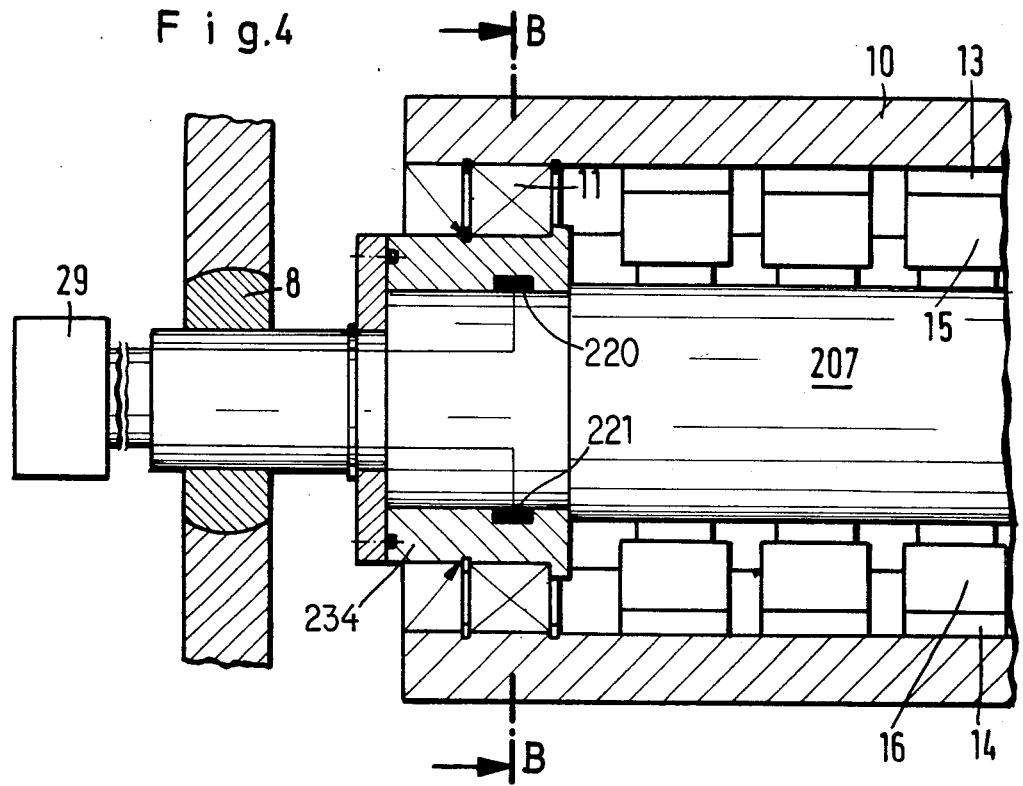
FIG. 4 is a fragmentary axial sectional view of an additional second roll.
Figure 5:
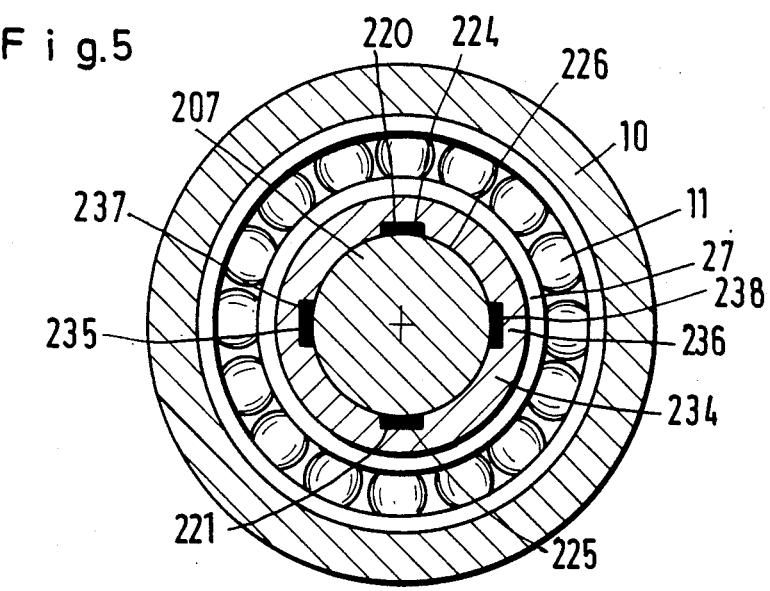
FIG. 5 is a sectional view as seen in the direction of arrows from the line B—B of FIG. 4.

Referring to FIGS. 4 and 5, there is shown a portion of a roll which can be used in lieu of the roll 1 of FIGS. 1-2 or in lieu of the roll including the shell 10 and carrier 107 of FIGS. 3. The carrier 207 of the roll of FIGS. 4 and 5 is surrounded by two sleeves 234 (only one shown) each of which is surrounded by the respective antifriction bearing (note the bearing 11 in FIGS. 4 and 5). The sensors 220, 221 for detection of stresses acting upon the bearing 11 are interposed between the peripheral surface 226 of the carrier 207 and the sleeve 234 which, in turn, is surrounded by the inner race 27 of the bearing 11. The internal surface of the sleeve 234 has two recesses 224, 225 for the respective sensors 220, 221. The internal surface of the sleeve 234 is further provided with two additional recesses 235, 236 which alternate with the recesses 224, 225 and accommodate two additional sensors 237, 238. The sensors 237, 238 are located in a plane which is preferably normal to the plane including the axis of the roll of FIGS. 4-5 and the axis of the associated roll (not shown in FIGS. 4 and 5). This enables the sensors 237 and 238 to transmit signals denoting the magnitude of forces acting upon the bearing 11 in a horizontal plane (it being assumed that the plane including the axis of the roll of FIGS. 4-5 and the associated roll is vertical). These signals are processed by the control unit 19 (not shown in FIGS. 4 and 5) which then adjusts certain motors 15 and/or 16 to eliminate or reduce such transverse stresses. FIGS. 4 and 5 further show the shell 10, the bearing 8 for the carrier 207, the supporting elements 13, 14 and the transducer 29.

The non-rotating sleeves 234 exhibit the advantage that they prevent or reduce the likelihood of deformation of the inner races 27.

The provision of additional sensors (such as the sensors 237 and 238) for each of the bearings 11 and 12 not only enables the corresponding control unit to eliminate stresses which tend to act upon the bearings in a plane extending at right angles to the plane including the axes of the roll shown in FIGS. 4-5 and the associated roll but also ensures that the end portions 10a, 10b of the shell 10 are invariably located exactly in the treating plane, even if it becomes necessary to flex certain parts of the intermediate portion 10c of the shell up or down as well as sideways, i.e., toward or away from the observer of FIG. 1. In order to allow for predictable deformation of selected parts of the intermediate portion 10c of the shell 10 in directions at right angles to the plane of FIG. 1, the roll embodying the structure of FIGS. 4-5 is preferably provided with two or more adjustable fluid-operated motors 15 and/or 16 for each supporting element 13 and/or 14, and such plural adjustable motors 15 and/or 16 are then spaced apart from one another, as considered in the circumferential direction of the shell 10. This can be seen in FIGS. 7 and 8.

Figure 6:
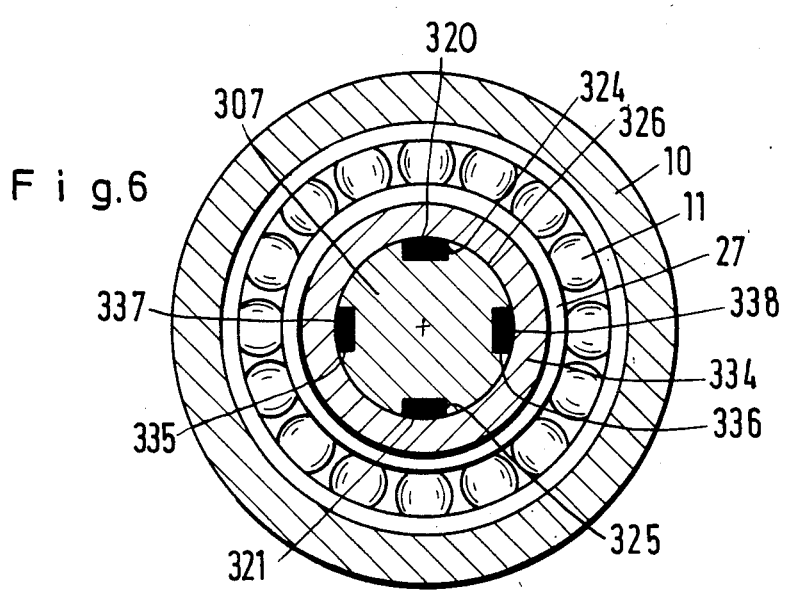
FIG. 6 is a transverse vertical sectional view of still another second roll.

FIG. 6 shows a portion of a roll having a flexible shell 10 whose end portions surround two antifriction bearings (only the bearing 11 and its inner race 27 are shown). The difference between the embodiment of FIGS. 5 and 6 is that the recesses 324, 325 for the sensors 320, 321 and the recesses 335, 336 for the sensors 337, 338 are provided in the peripheral surface 326 of the carrier 307 which is shown in FIG. 6. Thus, the sleeve 334 has a smooth cylindrical internal surface.

Figure 7:
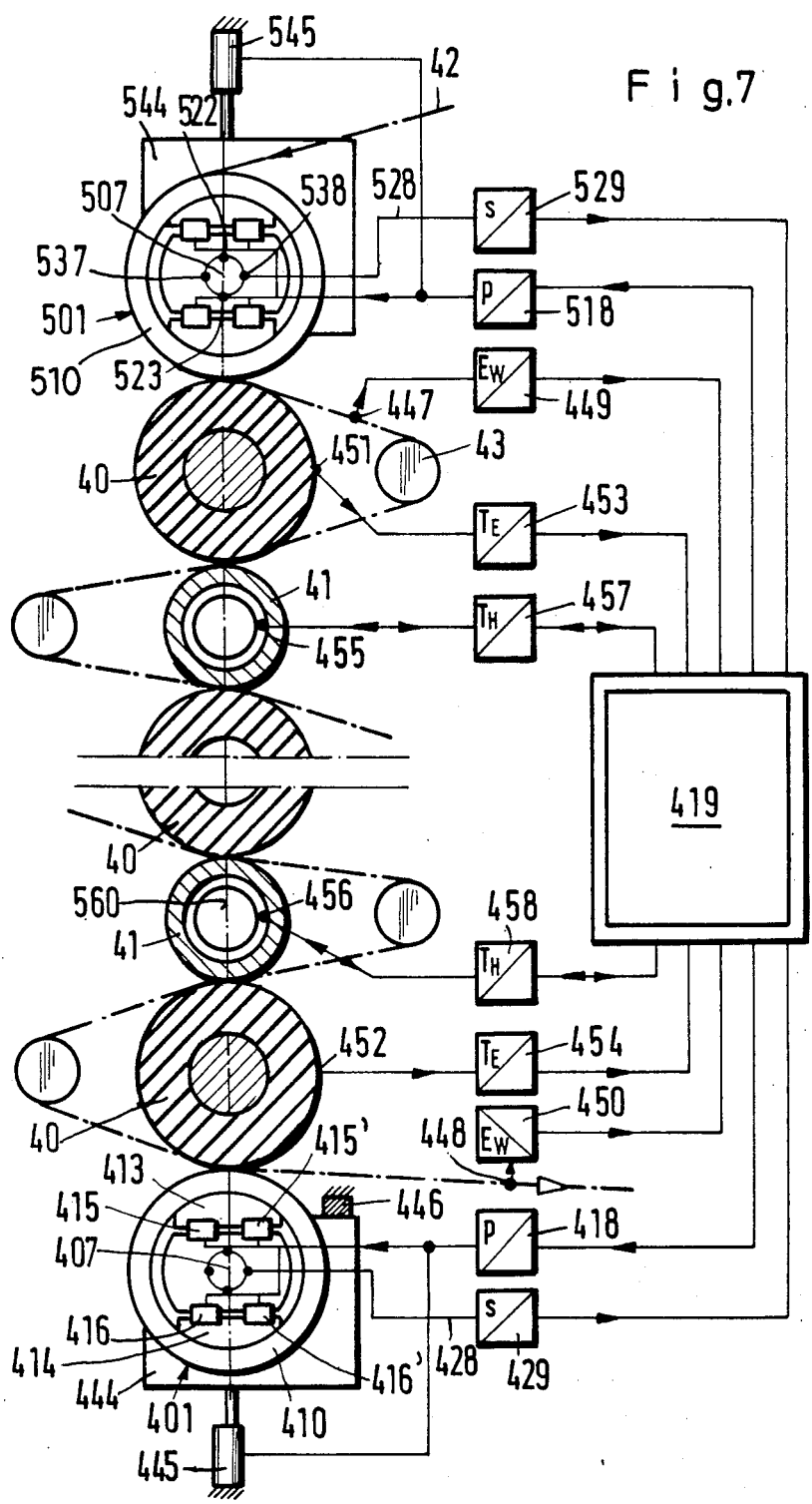
FIG. 7 is a partly diagrammatic and partly transverse vertical sectional view of a calender utilizing a roll assembly comprising seven superimposed rolls including two rolls of the type shown in FIGS. 4–5 or in FIG. 6.

FIG. 7 shows a roll assembly which can be used in a calender for the treatment of a running web 42 of paper or other flexible material. The roll assembly includes a lowermost roll 401 which is analogous to the roll 1, an uppermost roll 501 which is also analogous to the roll 1, and several intermediate rolls 40 and 41. The rolls 40 have elastomeric shells and alternate with rolls 41 which have hard (preferably metallic) shells. The web 42 of flexible material extends through the nips of the neighboring rolls 501, 40, 41, 40, 41, 40 and 401 (as considered from the top toward the bottom of FIG. 7) and is further trained over a portion of the uppermost roll 501 as well as over a set of suitably distributed guide rollers 43 (e.g., a set of four guide rollers).

The end portions of the carrier 407 for the flexible shell 410 of the lowermost roll 401 are mounted in bearings 444 (one shown in the lower portion of FIG. 7) which are or can be biased against fixed stops 446 in the frame of the calender by one or more fluid-operated motors 445, e.g., hydraulic cylinder and piston units. This ensures that the position of the axis of the carrier 407 (and hence of the end portions of the shell 410) is fixed.

The end portions of the carrier 507 for the flexible shell 510 of the uppermost roll 501 are mounted in bearings 544 (only one shown in the upper portion of FIG. 7) which are biased downwardly with a selected (variable) force by fluid-operated motors 545, preferably hydraulic cylinder and piston units analogous to the units 445 which urge the bearings 444 against the respective stops 446.

Each of the hydrostatic supporting elements 413 in the shell 410 of the lowermost roll 401 is or can be biased upwardly with a selected force by a pair of adjustable fluid-operated motors 415, 415', and each of the hydrostatic supporting elements 414 in the shell 410 is or can be biased downwardly with a selected force by a pair of adjustable fluid-operated motors 416, 416'. The motors 415, 415'and 416, 416'are angularly offset with reference to each other, as considered in the circumferential direction of the carrier 407, so as to enable the corresponding supporting elements 413 and 414 to even more accurately determine the shape of the intermediate portion of the shell 410 for the purpose of reducing or eliminating the stresses acting upon the bearings (not shown in FIG. 7) for the end portions of the shell 410. The just described distribution of the motors 415, 415', 416, 416' enables the respective supporting elements 413, 414 to counteract stresses acting upon the antifriction bearings in a vertical direction (in or parallel to the plane 560 including the axes of the rolls 401, 40, 41, 501 and intersecting the nips between these rolls) as well as those (transverse) stresses which act upon the bearings for the end portions of the shell 410 in a plane extending at right angles to the plane 560 and including the axis of the roll 401.

The roll 501 comprises four sensors 522, 523, 537, 538 for each of the two antifriction bearings which are surrounded by the end, portions of the shell 510. The sensors 522, 523, 537 and 538 are recessed into the peripheral surface of the carrier 507, into the internal surface of a shell surrounding the carrier 507 or are installed in flats provided therefor in the peripheral surface of the carrier 507. The distribution of sensors for the antifriction bearings within the confines of the end portions of the shell 410 of the lowermost roll 401 is or can be identical with the just described distribution of sensors 522, 523, 537, 538 in the shell 510. The outputs of the sensors in the shells 410, 510 are connected to the inputs of the corresponding transducers 429, 529 by conductors 428, 528, and the outputs of the transducers 429, 529 are connected to the corresponding inputs of the control unit 419. The motors 415, 415' and 416, 416' for the supporting elements 413, 414 in the shell 410 are adjustable in response to signals from the transducer 418 which receives signals from the corresponding output of the control unit 419. The transducer 418 further transmits signals to the motor or motors 445. The transducer 518 transmits signals to the motors 545 as well as to the motors for the supporting elements in the shell 510. Each of the conduits connecting the transducers 418, 518 with the respective motors includes a bundle of discrete conduits so that the pressure in each of the motors 445, 545, motors 415, 415', 416, 416' and the corresponding motors in the shell 510 can be regulated independently of the other motor or motors. This enhances the sensitivity of the calender and enables the control unit 419 to regulate the distribution of stresses along the shells 410 and 510 with a very high degree of accuracy.

The calender of FIG. 7 further comprises sensors 447 and 448 which monitor the characteristics of the running web 42 downstream of the nip of the roll 501 and the adjacent roll 40 and downstream of the nip of the roll 401 and the adjacent roll 40. Signals from the sensors 447, 448 are transmitted to the corresponding inputs of the control unit 419 by transducers 449 and 450. The sensors 447 and 448 can monitor the temperature, the thickness and/or other important characteristics of the running web 42.

Still further, the calender of FIG. 7 comprises temperature monitoring devices 451 and 452 which are respectively adjacent the peripheral surface of the uppermost roll 40 and the peripheral surface of the lowermost roll 40. Each of the sensors 451, 452 preferably comprises a full battery or row of sensors extending in parallelism with the axis of the respective roll 40 so as to individually determine the temperature of relatively short sections of such rolls and to transmit appropriate signals to transducers 453, 454 whose outputs are connected to the corresponding inputs of the control unit 419.

The calender of FIG. 7 preferably further comprises means for regulating (raising or lowering) the temperature of portions of or entire rolls 41. The temperature of each of these rolls is monitored by a discrete sensor 455, 456, respectively, and each of these sensors preferably comprises a battery or row of sensors extending in parallelism with the axis of the respective roll 41. The sensors 455, 456 respectively transmit signals to transducers 457, 458 which, in turn, transmit appropriate signals to the corresponding inputs of the control unit 419. As indicated in FIG. 7 by arrows, the transducers 457, 458 can further serve as a means for transmitting signals to the heating or cooling means for the respective rolls 41 so as to ensure that the peripheral surfaces of such rolls are maintained at an optimum temperature. For example, each of the rolls 41 can be heated or cooled by a suitable heat exchanger which includes means for circulating a fluid medium and for varying the temperature of such medium and/or the intensity of heat exchange between the medium and the hard shell of the respective roll 41.

The control unit 419 comprises a computer and a processor. This control unit evaluates the signals which are transmitted by the sensors 447, 448 and compares them with reference signals to ensure optimum selection of pressures and/or temperatures for a particular treatment of the running web 42. Thus, the signals from the unit 419 are transmitted to the transducer 518 to ensure an appropriate selection of the force with which the motor or motors 545 urge the uppermost roll 501 downwardly toward the neighboring roll 40. Adequate heating or cooling of the web 42 is ensured by the transducers 457, 458 which control and can alter the temperature of the rolls 41. The temperature of the web 42 is further influenced by the flexing work upon the elastic layers of the rolls 40 which, in turn, can be influenced by appropriate selection of pressures in the motors for the hydrostatic supporting elements in the shells 410 and 510 of the respective rolls 401 and 501. Thus, signals from the sensors 451 and 452 can influence the signals which are transmitted to the motors in the shells 401 and 501 by the respective transducers 418 and 518. For example, if the sensor 451 ascertains that the temperature at a particular section of the periphery of the respective roll 40 is excessive, the corresponding hydrostatic supporting element or elements in the shell 510 are adjusted to reduce the pressure upon such section of the periphery of the roll 40. Inversely, the pressure upon a particular portion of the periphery of a roll 40 is increased if the corresponding component of the sensor 451 or 452 transmits a signal denoting that the temperature in such section of the periphery of the respective roll 40 is too low. The pressure in the cylinder chamber or chambers of the motor or motors 445 must suffice to ensure that the bearings 444 are held in contact with the respective stops 446. Consequently, the force or forces which are transmitted by the motor or motors 445 must exceed the force or forces furnished by the motor or motors 545.

Furthermore, and as explained in connection with FIGS. 1 and 2, the control unit 419 also ensures that the stresses upon the antifriction bearings for the end portions of the shells 410 and 510 are eliminated or remain within acceptable limits. The provision of more than two sensors for each of these bearings (note the sensors 522, 523, 537, 538 in the shell 510) renders it possible to eliminate those stresses which act upon the bearings in the aforementioned plane 560 inluding the axes of all seven rolls of the calender which is shown in FIG. 7 as well as the stresses which act upon the bearings for the end portions of the shells 410 and 510 at right angles to the plane 560. All those components of forces which are generated by the adjustable motors in the shells 410 and 510 and act in the plane 560 must match the vertical forces which are generated by the motor or motors 545 and by the weight of the roller or rollers above the respective adjustable motors. All of the forces acting at right angles to the plane 560 also balance each other so that the end portions of the shells 410, 510 can be said to "float" on the respective antifriction bearings and that such bearings "float" on the respective portions of the corresponding carriers 407 and 507. In other words, the positions of the end portions of the shells 410 and 510 remain substantially unchanged (as considered radially of the axes of the rolls 401 and 501) but the motors in the shells 410 and 510 are capable of altering the configuration of the respective portions of these shells through the medium of the corresponding hydrostatic supporting elements so as to ensure that the running web 42 is subjected to desired optimal thermal and/or other stresses during travel through the nips between successive pairs of neighboring rolls. Adjustments in the configuration of selected zones of the intermediate portions of the shells 410, 510 not only allow for changes in the distribution of stresses (as considered in the axial direction of the rolls) but also for appropriate regulation of temperatures in various portions of the rolls 40 and hence also in the corresponding longitudinally extending portions of the running web 42.

The calender of FIG. 7 can be modified in a number of ways without departing from the spirit of the invention. For example the motor or motors 545 can be replaced with mechanical shifting means for the roll 501 and the force which is applied to the uppermost roll 40 is then regulated (primarily or exclusively) by the adjustable fluid-operated motors in the interior of the shell 510.

The sensors 447, 448 may be of the type known as KL manufactured and distributed by the firm Lippke, Neuwied, German Federal Republic. The temperature monitoring devices 451, 452 may be of the type known as KT 17 manufactured and sold by the firm Heimann GmbH, Wiesbaden, German Federal Republic. The temperature monitoring sensors 445, 446 may be of the type known as Pt 100 manufactured and sold by the firm Merz Messfühlertechnik GmbH, Diedenhofen, German Federal Republic. The transducers 449 and 450 may be of the type known as GTU manufactured and sold by Brown-Bovery Corporation.

The elastomeric shells of the rolls 40 can be made of natural rubber or from a suitable elastomeric synthetic plastic material. The manner in which the elasticity of the outer layer of a roll can be used to achieve desired temperatures in longitudinally spaced-apart portions of the nip between a roll having an elastomeric outer layer and the adjacent roll is fully disclosed in commonly owned copending U.S. pat. application Ser. No. 406,494. Since the end portions of the shells 410 and 510 are not stressed by the respective bearings of the rolls 401 and 501, the intermediate portions of these shells can be deformed with a very high degree of accuracy to thus ensure that the temperature in each and every portion of the adjacent roll 40 matches or closely approximates a desired optimum temperature.

The feature that the bearings 444 for the carrier 407 of the lowermost roll 401 are held in contact with fixed stops 446 contributes to reliability of adjustments which are effected by the control unit 419 because the position of the roll 401 in the frame of the machine is fixed. This enables the control unit 419 to select the stresses acting between the pairs of neighboring rolls and the temperatures at the peripheries of certain rolls with a surprisingly high degree of accuracy.

Figure 8:
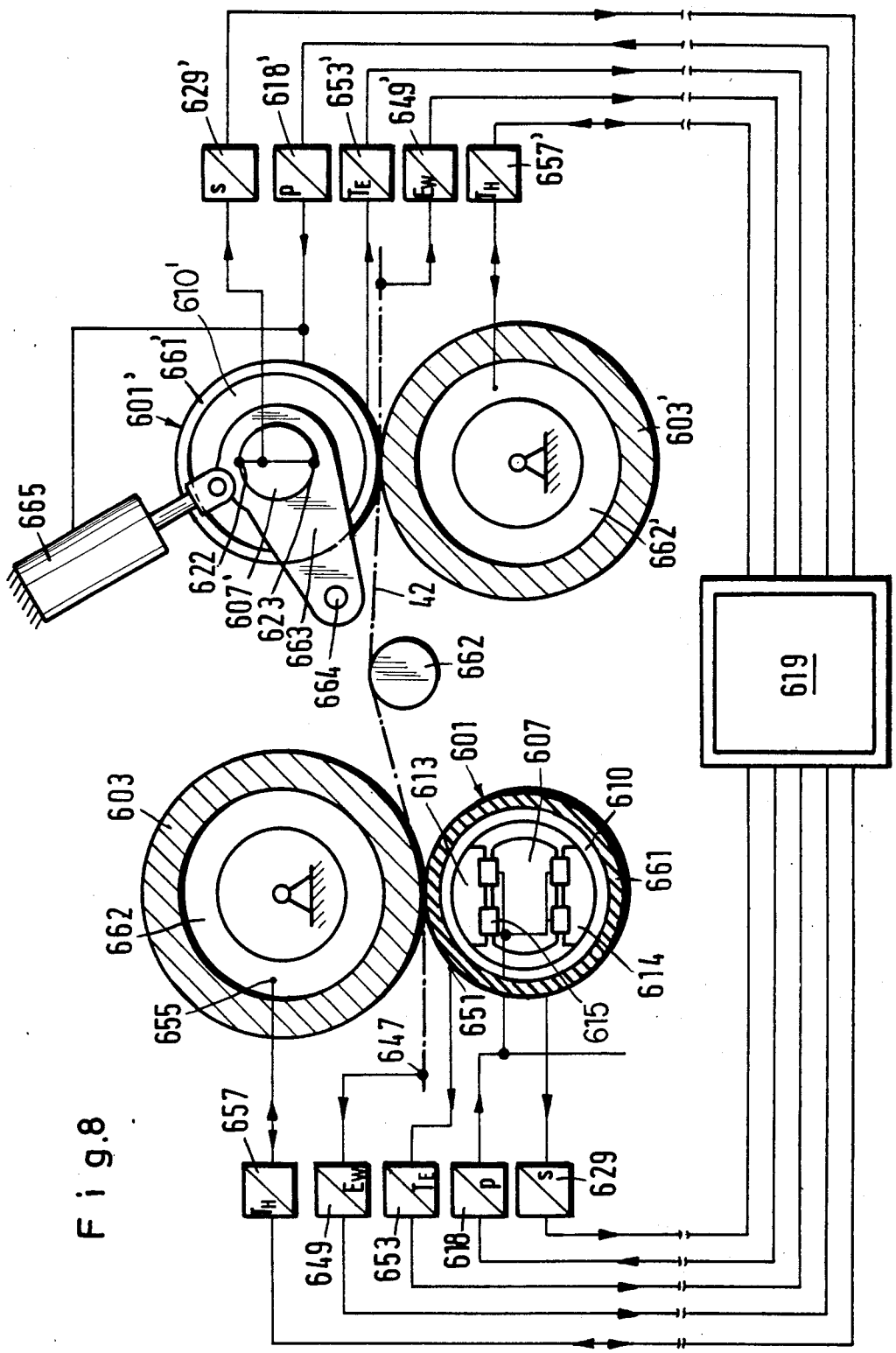
FIG. 8 is a partly diagrammatic and partly transverse vertical sectional view of a further roll assembly wherein one roll of each pair of neighboring rolls can be pivoted toward and away from the companion roll.

FIG. 8 shows a portion of a modified calender. All such parts which are clearly analogous to or identical with the corresponding parts of the calender of FIG. 7 are denoted by similar reference characters plus 100. The web 42 is caused to pass through the nip of a first pair of rolls 601, 603 and a second pair of rolls 601', 603'. The rolls 601 and 601' have flexible shells 610, 610' each of which has a peripheral layer 661, 661' of elastomeric material. The rolls 603 and 603' are fixedly mounted in the frame of the machine, i.e., they rotate about fixed horizontal axes. The shells of the rolls 603 and 603' consist of a rigid and hard metallic material, and these shells surround internal chambers 662, 662' which receive a circulating or circulatable heat exchange medium in order to maintain the temperature at the exterior of the shells of the rolls 603, 603'at a selected value or to alter such temperature when the need arises. The sensors 647, 651, 655 and the transducers 618, 629, 649, 653, 657 for the rolls 601 and 603 perform the same functions as the similarly referenced sensors and transducers of the calender which is shown in FIG. 7. The corresponding transducers for the rolls 601' and 603' are shown at 618', 629', 649', 653' and 657'. FIG. 8 further shows two (622 and 623) of the sensors on the carrier 607' for the shell 610' of the roll 601'. It is clear that the calender of FIG. 8 comprises numerous additional sensors which have been omitted for the sake of clarity.

The axis of the carrier 407' for the shell 610' of the roll 601' is movable toward and away from the fixed axis of the associated roll 603' by means of two levers 663 (only one shown) which support the respective end portions of the carrier 407' and are pivotable about the fixed axes of two horizontal pivot members 664. The means for pivoting the levers 663 and for thereby biasing the outer layer 661' of the shell 610' against the hard shell of the roll 603' includes fluid-operated motors 665 of which only one is shown in the upper portion of FIG. 8. The motors 665 are preferably hydraulic motors and the pressure of fluid medium in their chambers is regulated by the transducer 618' which receives appropriate signals from the corresponding output of the control unit 619. The motors 665 can lift the roll 601' off the roll 603 or off the adjacent portion of the web 42. Moreover, the motors 665 can bias the elastic outer layer 661' of the shell 610' against the web 42 or against the shell of the roll 603' with a selected force which is preferably variable within a rather wide range. Thus, the motors 665 cooperate with the levers 663 to determine the force with which the roll 601' bears against the web 42 or against the roll 603'. The distribution of forces in the axial direction of the roll 601' is determined by the adjustable fluid-operated motors and hydrostatic supporting elements in the interior of the shell 610'.

The carrier 607 for the shell 610 of the roll 601 is also mounted on two levers (not shown) which correspond to the levers 663 and are pivotable by fluid-operated motors corresponding to the motors 665. FIG. 8 further shows one of the hydrostatic supporting elements 613, one of the hydrostatic supporting elements 614 and a guide roller 662 for the web 42.

Mounting of the carriers 607 and 607' on levers 663 which are pivotable by fluid-operated motors (665) renders it possible to lift the rolls 601 and 601' off the associated rolls 603 and 603' practically without any delay because the lifting means need not overcome any play between the carriers 407, 407' and the respective shells 410, 410'. The same applies for the return movements of the rolls 601, 601' into engagement with the associated rolls 603, 603'. The rolls 601 and 601' are moved exclusively under the influence of the respective fluid-operated motors 665, and the speed at which the rolls 601, 601' are engaged with or disengaged from the associated rolls 603, 603' is not affected by the diameters of such rolls. The placing of elastomeric outer layers (661, 661') on the pivotable rolls 601 and 601' is desirable and advantageous because these layers must be refinished or replaced from time to time and such operation is simpler if the layers are provided on rolls which can be readily disengaged from the associated rolls.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roll assembly, particularly a calender, comprising a first roll rotatable about a first axis; a second roll rotatable about a second axis which is parallel to said first axis, said second roll comprising a flexible elongated cylindrical shell defining with the first roll an elongated nip and having an internal surface, an intermediate portion and first and second end portions, a rigid carrier surrounded by said shell, first and second bearings respectively interposed between said carrier and the first and second end portions of said shell, and signal generating first and second sensor means for monitoring the stresses which are applied to said first and second bearings in a plane including said axes and intersecting said nip, particularly when a web of material which is being treated by the roll assembly passes through said nip; and means for counteracting said stresses, includng at least one row of supporting elements installed in said shell between said first and second end portions and surrounded by the corresponding parts of said intermediate portion, at least one adjustable motor installed between each of said supporting elements and said carrier and arranged to urge the respective supporting element toward the internal surface of said shell to thereby select the force with which the corresponding part of said intermediate portion is urged toward the first roll, and control means responsive to the signals from said sensor means and operative to adjust said motors so as to minimize or eliminate the stresses to which said bearing means are subjected by the respective end portions of said shell.

2. The assembly of claim 1, wherein said bearings include antifriction bearings.

3. The assembly of claim 1, wherein said supporting elements are hydrostatic supporting elements.

4. The assembly of claim 1, further comprising means for transmitting to said control means additional signals for adjustment of said motors as a function of at least one variable parameter.

5. The assembly of claim 1, wherein each of said sensor means comprises two discrete sensors disposed in the region of said plane and substantially diametrically opposite each other with reference to the axis of said second roll.

6. The assembly of claim 1, wherein each of said bearings includes an antifriction bearing having an inner race surrounding said carrier, said sensor means being installed between said carrier and the respective inner races.

7. The assembly of claim 6, wherein at least one of said sensor means is recessed into said carrier.

8. The assembly of claim 6, wherein said carrier has a peripheral surface provided with flats and said sensor means are adjacent to such flats.

9. The assembly of claim 6, wherein said second roll further comprises a sleeve interposed between each of said inner races and said carrier, said sensor means being disposed within the confines of said sleeves.

10. The assembly of claim 9, wherein said shell is rotatable relative to said sleeves.

11. The assembly of claim 9, wherein said sensor means are recessed into said sleeves.

12. The assembly of claim 9, wherein said sensor means are recessed into said carrier.

13. The assembly of claim 1, wherein said sensor means are force transducers.

14. The assembly of claim 1, wherein said sensor means are pressure transducers.

15. The assembly of claim 1, wherein said sensor means are displacement transducers.

16. The assembly of claim 1, wherein said sensor means are distance transducers.

17. The assembly of claim 1, wherein each of said bearings include two portions one of which surrounds the other with play.

18. The assembly of claim 1, wherein said counteracting means further comprises additional supporting elements angularly offset with reference to the supporting elements of said row and at least one additional adjustable motor for each of said additional supporting elements, said second roll further comprising additional first and second sensor means disposed in the regions of the respective bearings and arranged to generate signals denoting the magnitude of additional stresses acting upon the respective bearings at right angles to said plane, said control means being operative to adjust at least said additional supporting elements so as to minimize or eliminate said additional stresses.

19. The assembly of claim 1, wherein at least one of said rolls has a viscoelastic outer layer which contacts the external surface of the other roll in the absence of any material in said nip and further comprising signal generating means for monitoring the temperature of said outer layer at a plurality of locations which are spaced apart from one another as considered in the longitudinal direction of said intermediate portion, said control means being arranged to adjust said motors in dependency on the characteristics of the temperature-denoting signals at the respective locations.

20. The assembly of claim 1, wherein said first roller is disposed at a level above said second roller and further comprising a third roller at least substantially identical with said second roller and disposed at a level above said first roller, and means for biasing said third roller downwardly toward said first roller.

21. The assembly of claim 20, further comprising at least one additional roller interposed between said first roller and one of said second and third rollers.

22. The assembly of claim 1, further comprising means for moving said carrier nearer to and further away from the axis of said first roller.

23. The assembly of claim 22, wherein the axis of said first roller is a fixed axis and said moving means comprises first and second levers pivotable about fixed axes and supporting said carrier adjacent to the respective end portions of said shell and fluid-operated motor means for pivoting said levers.

24. The assembly of claim 22, wherein said moving means includes means for biasing said shell against said first roll.

25. The assembly of claim 1, wherein the axes of said rolls are disposed at different levels.

* * * * *